(12) United States Patent
Ligander et al.

(10) Patent No.: US 11,063,647 B2
(45) Date of Patent: Jul. 13, 2021

(54) ALIGNMENT MEANS FOR DIRECTIVE ANTENNAS

(71) Applicant: Telefonaktiebolaget LM Ericsson (publ), Stockholm (SE)

(72) Inventors: Per Ligander, Gothenburg (SE); Martin Johansson, Mölndal (SE); Jan Sandberg, Frillesås (SE); Daniel Sjöberg, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/971,732

(22) PCT Filed: Mar. 15, 2018

(86) PCT No.: PCT/EP2018/056501
§ 371 (c)(1),
(2) Date: Aug. 21, 2020

(87) PCT Pub. No.: WO2019/174731
PCT Pub. Date: Sep. 19, 2019

(65) Prior Publication Data
US 2020/0395986 A1 Dec. 17, 2020

(51) Int. Cl.
*H04B 7/06* (2006.01)
*H04B 17/27* (2015.01)
(Continued)

(52) U.S. Cl.
CPC ......... *H04B 7/0617* (2013.01); *H01Q 1/1257* (2013.01); *H04B 17/27* (2015.01); *H04B 17/318* (2015.01)

(58) Field of Classification Search
CPC .... H04B 7/0617; H04B 17/27; H04B 17/318; H01Q 1/1257
(Continued)

(56) References Cited

U.S. PATENT DOCUMENTS 7,501,982 B2 3/2009 Charash et al.
2013/0040594 A1* 2/2013 Vilhar .................. H04W 16/28
455/226.4

(Continued)

*Primary Examiner* — Fitwi Y Hailegiorgis
(74) *Attorney, Agent, or Firm* — Coats & Bennett, PLLC

(57) ABSTRACT

The present disclosure relates to a device (140) adapted for aligning a first directive antenna (101) in an alignment direction D1 towards a second antenna (102). The device is adapted to acquire measurement data regarding: •—a first signal power (301) received from the second antenna (102) using a first effective antenna aperture (202) when the first directive antenna (101) is moved along an angular span (306) passing a desired alignment angle (307) along a certain direction (111, 112); and •—a second signal power (302) received from the second antenna (102) using a second effective antenna aperture (203) when the first directive antenna (101) is moved along an angular span (306) passing a desired alignment angle (307) along a certain direction, the second effective antenna aperture (203) being smaller than the first effective antenna aperture (202). The device (140) is furthermore adapted to determine the alignment direction D1 as an angle (307) in the angular span (306), at which angle (307) a local maximum value (304) for both the first signal power (301) and the second signal power (302) coincide.

15 Claims, 4 Drawing Sheets

(51) Int. Cl.
*H04B 17/318* (2015.01)
*H01Q 1/12* (2006.01)
(58) Field of Classification Search
USPC .................................................. 375/262, 145
See application file for complete search history.

(56) References Cited

U.S. PATENT DOCUMENTS

| | | | |
|---|---|---|---|
| 2015/0290465 A1* | 10/2015 | Mashiach | ............... H02J 50/12 607/61 |
| 2016/0218427 A1 | 7/2016 | Derneryd | |
| 2017/0311307 A1 | 10/2017 | Negus et al. | |

* cited by examiner

ALIGNMENT MEANS FOR DIRECTIVE ANTENNAS

TECHNICAL FIELD

The present disclosure relates to alignment of a first directive antenna in a direction towards a second antenna.

BACKGROUND

Microwave link communication is performed between microwave link nodes positioned at different sites, where two microwave link nodes that are adapted to communicate with each other constitute a microwave link hop. A microwave link node typically comprises a mast onto which a microwave radio transceiver and a link antenna are mounted.

Alignment of a microwave link hop between two sites is normally based on manual work. According to regulations, at least two persons should be located at each site, one person climbing the mast while the other person is remaining at the ground. The person that climbs the masts at each site has to carry antenna mount equipment including a mast bracket, the link antenna, the microwave radio transceiver and several tools. The link antenna with the antenna mount is assembled on the mast; a rough alignment is done before the bracket is fixed. The microwave radio transceiver is assembled onto and connected to the link antenna, and is then turned on.

A final alignment is done by one person at each mast by means of adjustment screws located in different positions on the antenna mount. When best Received Signal Strength Indication (RSSI) is found on each site, the persons in the masts tighten a number of locking screws and nuts on the respective antenna mount, and then the deployment is finished.

U.S. Pat. No. 7,501,982 described alignment of two directional antennas by defining a first link budget in a normal operational mode in which a main lobe of a first antenna points toward a second antenna, and using an alignment operational mode having a second link budget greater than the first link budget.

Aligning two antennas with a narrow beam can take a long time. There is also an uncertainty if the antennas are correctly pointing on the main lob at the opposite site. The adjustment can therefore be time-consuming and inaccurate.

SUMMARY

It is an object of the present disclosure to provide enhanced alignment of a first directive antenna in a direction towards a second antenna.

Said object is obtained by means of a device adapted for aligning a first directive antenna in an alignment direction D1 towards a second antenna. The device is adapted to acquire measurement data regarding a first signal power received from the second antenna using a first effective antenna aperture when the first directive antenna is moved along an angular span passing a desired alignment angle along a certain direction, and a second signal power received from the second antenna using a second effective antenna aperture when the first directive antenna is moved along an angular span passing a desired alignment angle along a certain direction. The second effective antenna aperture is smaller than the first effective antenna aperture. The device is furthermore adapted to determine the alignment direction D1 as an angle in the angular span, at which angle a local maximum value for both the first signal power and the second signal power coincide.

This confers advantages regarding performing an easily handled alignment during a reduced time compared to prior alignment techniques, while false alignment is avoided.

According to some aspects, the first directive antenna comprises an array antenna that in turn comprises a first plurality of antenna elements that is engaged for the first effective antenna aperture, and a second plurality of antenna elements, comprised in the first plurality of antenna elements, that is engaged for the second effective antenna aperture.

This confers an advantage regarding easily obtaining different effective antenna apertures in an array antenna.

According to some aspects, the first directive antenna comprises an array antenna that in turn comprises a first plurality of antenna elements that is engaged for the first effective antenna aperture, where a second plurality of antenna elements comprised in the first plurality of antenna elements are phase shifted for the second effective antenna aperture.

This confers an advantage regarding easily obtaining different effective antenna apertures in an array antenna.

According to some aspects, the first directive antenna is a reflector antenna that comprises a first antenna feeder that is engaged for the first effective antenna aperture and a second antenna feeder that is engaged for the second effective antenna aperture, where one antenna feeder is in focus and the other antenna feeder is out of focus.

This confers an advantage regarding easily obtaining different effective antenna apertures for a reflector antenna.

According to some aspects, the first directive antenna is a reflector antenna, where the reflector antenna comprises a refracting element for the second effective antenna aperture.

This confers an advantage regarding easily obtaining different effective antenna apertures for a reflector antenna.

According to some aspects, the device is adapted to toggle the first directive antenna between the first effective antenna aperture and the second effective antenna aperture while the first directive antenna is moved past the desired alignment angle.

This confers an advantage regarding providing a result for one movement past the desired alignment angle.

According to some aspects, the device is adapted to normalize the first signal power and the second signal power, to calculate a difference signal between the normalized first signal power and the normalized second signal power, and to determine a local minima for the difference signal.

This confers an advantage regarding enabling use of a separate difference signal.

According to some aspects, each signal power corresponds to a received signal strength indication (RSSI) value.

This confers an advantage regarding using a well-known signal power measure.

There are also disclosed herein methods associated with the above-mentioned advantages.

BRIEF DESCRIPTION OF THE DRAWINGS

The present disclosure will now be described more in detail with reference to the appended drawings, where.

DETAILED DESCRIPTION

Figure 1:
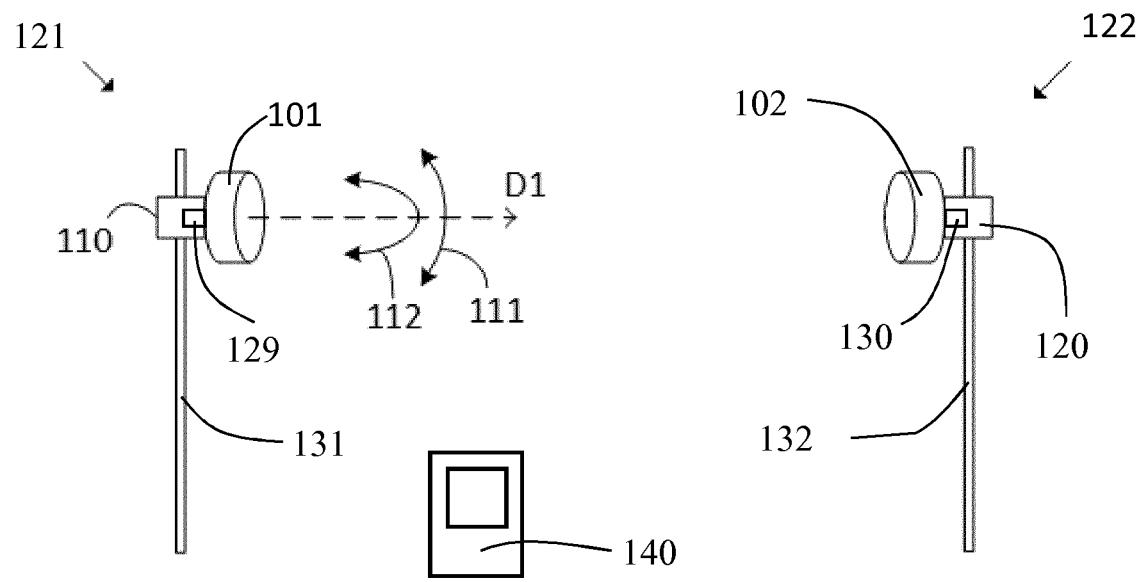
FIG. 1 schematically shows two microwave link nodes.

With reference to FIG. 1, there is a first microwave link node 121 and a second microwave link node 122. The first microwave link node 121 comprises a first directive antenna 101, a first microwave radio transceiver 129 that is attached to the first directive antenna 101, and a first alignment device 110 that also is attached to the first directive antenna 101. The first microwave link node 121 also comprises a first mast 131 onto which the first alignment device 110 is attached.

Correspondingly, the second microwave link node 122 comprises a second directive antenna 102, a second microwave radio transceiver 130 that is attached to the second directive antenna 102, and a second alignment device 120 that also is attached to the second directive antenna 102. The second microwave link node 122 also comprises a second mast 132 onto which the second alignment device 120 is attached.

Figure 6:
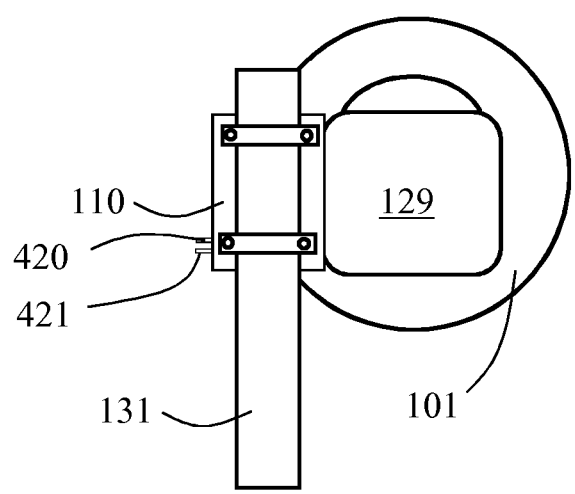
FIG. 6 schematically shows a view of a microwave link node.

As shown for the first microwave link node 121 in FIG. 6, still with reference also to FIG. 1, according to some aspects, the first alignment device 110 comprises an azimuth adjustment screw 420 and an elevation adjustment screw 421, which adjustment screw 420, 421 are arranged relatively close to each other on the same side of the first alignment device 110. The azimuth adjustment screw 420 is adapted to adjust the first alignment device 110 in an azimuth direction 112 and the elevation adjustment screw 421 is adapted to adjust the first alignment device 110 in an elevation direction 111. Rotation of the adjustment screws 420, 421 thus controls alignment of the first directive antenna 101 in certain directions.

The respective adjustments are performed by rotation of a corresponding adjustment screw 420, 421, preferably only one tool type is needed for executing such rotation, according to some aspects a screwdriver device. According to some aspects, the adjustment screws 420, 421 are connected to a respective worm gear or similar for effectuating a physical displacement, such that a self-locking functionality is obtained. This provides an accurate alignment. Other types of alignment is of course possible, for example rotating the antenna fixture on the mast, or using a common type of antenna fixture where alignment require adjustment of screws and nuts on the antenna fixture to make a proper alignment in azimuth and elevation.

Figure 2:
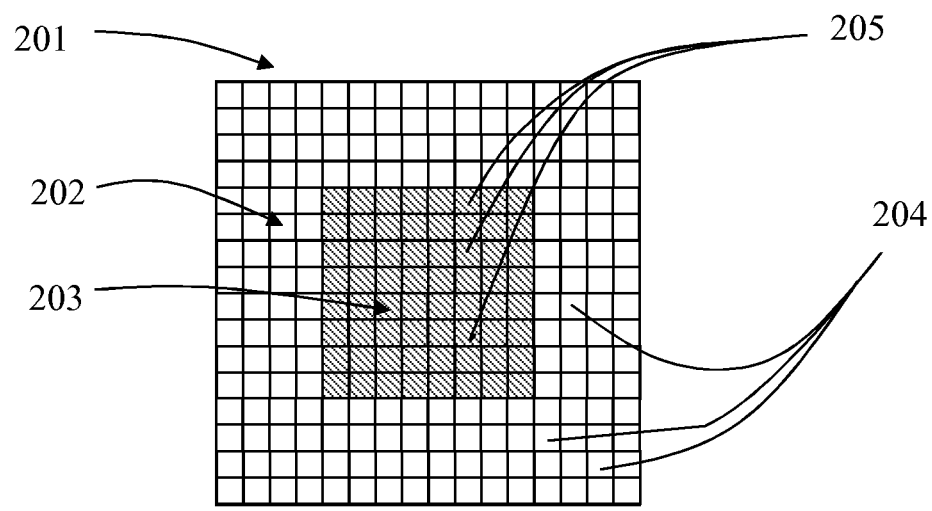
FIG. 2 schematically shows an array antenna aperture.
Figure 4:
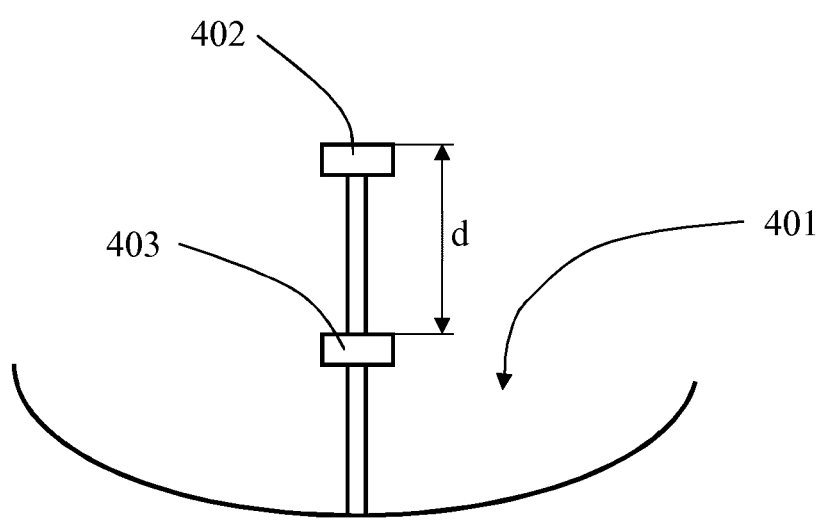
FIG. 4 schematically shows a first example of a reflector antenna.

With reference also to FIG. 2 and FIG. 4, the present disclosure relates to device 140 adapted for aligning the first directive antenna 101 in a direction D1 towards a second antenna 102. The device 140 in question can be a measurement and/or presentation instrument that is connected to the first microwave radio transceiver 129, in a wired or wireless manner, or even a smartphone or the like that is loaded with an appropriate software.

Figure 3:
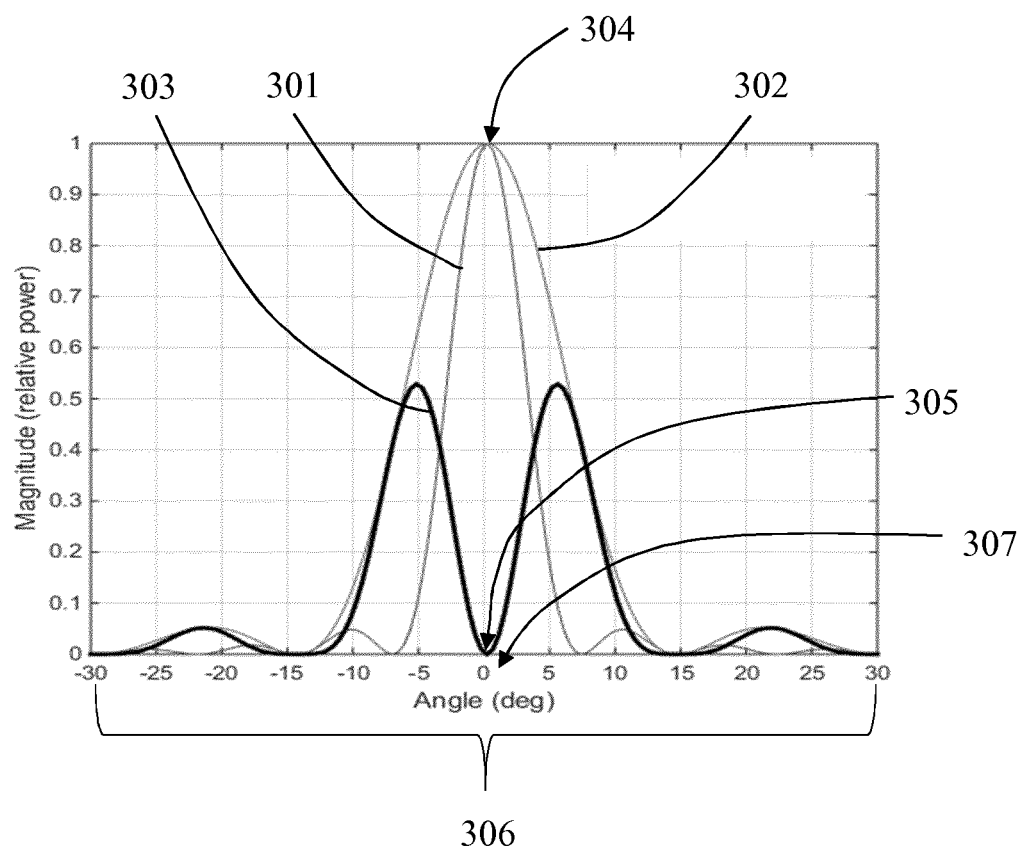
FIG. 3 shows a diagram of received signal power versus angle.

With reference also to FIG. 3, when the microwave link nodes 121, 122 are running, the device 140 is adapted to acquire measurement data regarding a first signal power 301 received from the second antenna 102 using a first effective antenna aperture 202 when the first directive antenna 101 is moved along an angular span 306 passing a desired alignment angle 307 along a certain direction 111, 112.

According to some aspects, in this example the first directive antenna 101 is moved along the azimuth direction 112 by means of rotation of the azimuth adjustment screw 420, and the angle span is from −30° to 30°. The first signal power 301 is according to some aspects constituted by a received signal strength indication (RSSI) value. As shown in FIG. 3, the first signal power 301 has local maxima at about +/−17.5°, +/−10.5° and 0°.

According to the present disclosure, the device 140 is adapted to acquire measurement data regarding a second signal power 302 received from the second antenna 102 using a second effective antenna aperture 203 when the first directive antenna 101 is moved along an angular span 306 passing a desired alignment angle 307 along a certain direction. The second effective antenna aperture 203 is smaller than the first effective antenna aperture 202, which results in that the received second signal power 302 versus azimuth angle has a lower maximum value than the received first signal power 301 versus azimuth angle and corresponds to a wider main beam than the received first signal power 301 versus azimuth angle.

The device 140 is furthermore adapted to determine the alignment direction D1 as an angle 307 in the angular span 306, at which angle 307 a local maximum value 304 for both the first signal power 301 and the second signal power 302 coincide.

According to some aspects, in this example the first directive antenna 101 is again moved along the azimuth direction 112 by means of rotation of the azimuth adjustment screw 420, in the same angle span from −30° to 30°. The second signal power 302 is according to some aspects also constituted by an RSSI value. As shown in FIG. 3, the second signal power 302 has local maxima at about +/−22° and 0°. The local maximum value 304 for both the first signal power 301 and the second signal power 302 thus coincide at 0°, which is the sought alignment direction D1.

According to some aspects, the device 140 is adapted to determine at which angle that the local maximum values 304 coincide by being adapted to first normalize the first signal power 301 and the second signal power 302 such that their respective maximum power levels coincide. The device 140 is then adapted to calculate a difference signal 303 between the normalized first signal power 301 and the normalized second signal power 302 and then to determine a local minima 305 for the difference signal 303. This direction of this local minima corresponds to the direction of the coinciding local maximum values 304 and thus corresponds to the sought alignment direction D1.

Normalizing signal powers does thus in this context means that the respective maximum power levels coincide.

The alignment procedure is performed at both link nodes 121, 122 until a satisfactory alignment result is obtained.

The different effective antenna apertures 202, 203 can be obtained in several way; a few examples will be presented here.

With reference to FIG. 2, according to some aspects, the first directive antenna 101 comprises an array antenna 201 that in turn comprises a first plurality of antenna elements 204 (only a few marked with reference sign for reasons of clarity) for the first effective antenna aperture 202. The array antenna 201 further comprises a second plurality of antenna elements 205 (only a few marked with reference sign for reasons of clarity), comprised in the first plurality of antenna elements 204, for the second effective antenna aperture 203.

In FIG. 2, the second plurality of antenna elements 205 are marked as grey, and there are here 64 antenna elements in the second plurality of antenna elements 205. The first plurality of antenna elements 204 is in this example constituted by both antenna elements marked as white and antenna elements are marked as grey, and there are here 256 antenna elements in the first plurality of antenna elements 204. The second plurality of antenna elements 205, and thus the second effective antenna aperture 203, is here obtained by starting from the first plurality of antenna elements 204, and thus the first effective antenna aperture 203, and then disengage those that are marked as white. This can be controlled by means of the device 140 that during alignment controls the first microwave radio transceiver 129 to turn certain antenna elements on and off according to the above.

According to some aspects, the effective antenna apertures 202, 203 correspond to more or less separate groups of antenna elements. According to some aspects, the first plurality of antenna elements, that constitutes the first effective antenna aperture, only comprises those 192 antenna elements that are marked as white in FIG. 2. Generally, the effective antenna apertures correspond to groups of antenna elements such that desired beam widths are obtained for the effective antenna apertures.

According to some aspects, instead of disengaging those antenna elements that are marked as white for obtaining the second effective antenna aperture, the second plurality of antenna elements 205 is phase shifted for the second effective antenna aperture. The phase shift is according to some aspects suitably around 120°.

According to some aspects, the different effective antenna apertures and the resulting beam widths are obtained by phase shifting between more or less separate groups of antenna elements. For example, phase shifting can be made between the antenna elements that are marked as white in FIG. 2 and the antenna elements that are marked as grey in FIG. 2.

With reference to FIG. 4, according to some aspects, the first directive antenna 101 comprises a reflector antenna 401 that in turn comprises a first antenna feeder 402 used for the first effective antenna aperture and a second antenna feeder 403 used for the second effective antenna aperture, where there is a mounting difference d between the antenna feeders 402, 403. Due to this difference, the first antenna feeder 402 is in focus and the second antenna feeder 403 is out of focus which results in a wider main beam versus azimuth angle. According to some aspects, the difference d is of such a magnitude that a sufficient beam width is obtained.

Figure 5:
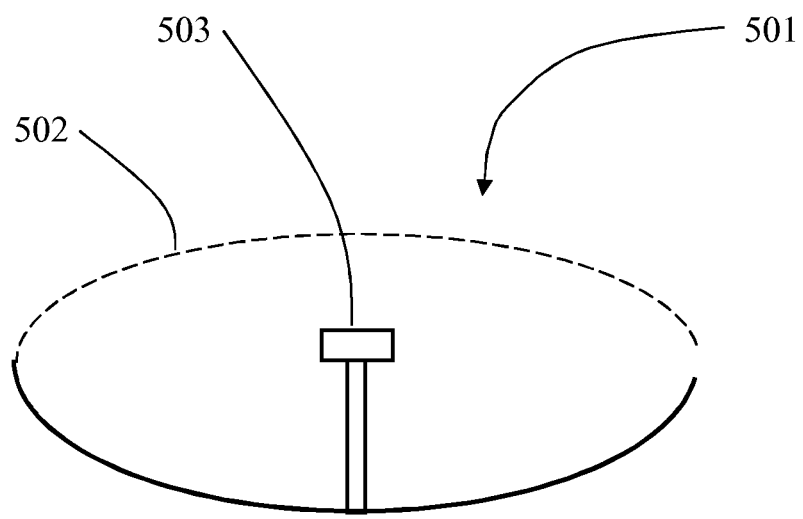
FIG. 5 schematically shows a second example of a reflector antenna.

With reference to FIG. 5, according to some aspects, the first directive antenna 101 comprises a reflector antenna 501 where a refracting element 502 is used for the second effective antenna aperture, and where the refracting element 502 is removed for the first effective antenna aperture. This example requires a physical maneuver for changing between the first effective antenna aperture and the second effective antenna aperture, while the other examples can be controlled electrically without any moving parts.

When moving the first directive antenna 101 along the angular span 306, it is according to some aspects possible to toggle the first directive antenna 101 between the first effective antenna aperture 202 and the second effective antenna aperture 203 while moving the first directive antenna 101 past the desired alignment angle 307. This procedure is evidently most suitable for the examples described with reference to FIG. 2 and FIG. 4, where, according to some aspects, the device 140 is adapted to control said toggling.

When moving the first directive antenna 101 along the angular span 306, it is according to some aspects also possible to move the first directive antenna 101 past the desired alignment angle 307 at a first time while using the first effective antenna aperture 202, and moving the first directive antenna 101 past the desired alignment angle 307 at a second time while using the second effective antenna aperture 203. This procedure is evidently suitable for all the examples described, and most suitable for the example described with reference to FIG. 5.

The present disclosure is not limited to the example described above, but may vary within the scope of the appended claims. For example, the angle spans can be of any suitable size, and can differ between the effective antenna apertures 202, 203.

The device 140 can be connected to the first microwave link node 121 in any suitable manner, such as by means of wifi or a wired connection.

Other types of directive antennas are conceivable.

The array antenna can for example be in the form of a patch antenna, a slot antenna or a dipole antenna, where a slot antenna can be formed in a dielectric material or as a waveguide antenna.

The second directive antenna 102 is suitably aligned towards the first directive antenna 101 in a corresponding manner.

During alignment, the directive antenna 101 is moved along the angular span 306 along any suitable direction 111, 112 such as an elevation direction 111. During alignment, the directive antenna 101 is according to some aspects moved along angular span in two or more directions.

The term effective antenna aperture is a well-known parameter and is according to some aspects generally constituted by a theoretical measure of how effective an antenna is at receiving power, such as how much power that is captured from a given plane wave.

According to some aspects, signal power can comprise bit errors and/or other types of quality measures.

Figure 7:
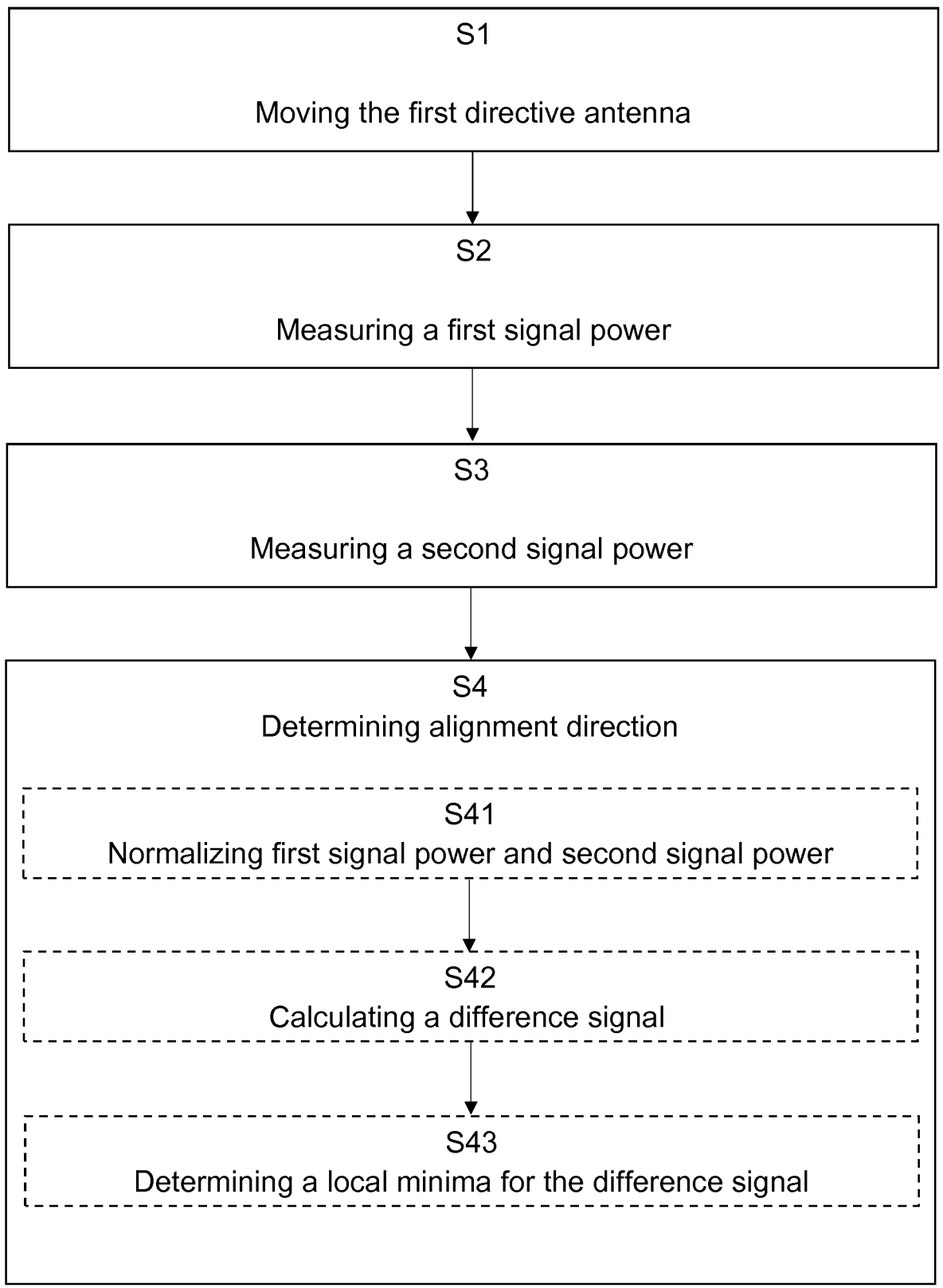
FIG. 7 shows methods according to the present disclosure.

Generally, with reference to FIG. 7, the present disclosure relates to a method at a first directive antenna 101 for determining an alignment direction D1 towards a second antenna 102, the method comprising:

moving S1 the first directive antenna 101 along an angular span 306 passing a desired alignment angle 307 along a certain direction 111, 112;

measuring S2 a first signal power 301 received from the second antenna 102 using a first effective antenna aperture 202 when moving the first directive antenna 101;

measuring S3 a second signal power 302 received from the second antenna 102 using a second effective antenna aperture 203 when moving the first directive antenna 101, the second effective antenna aperture 203 being different the first effective antenna aperture 202; and determining S4 the alignment direction D1 as an angle 307 in the angular span 306, at which angle 307 a local maximum value 304 for both the first signal power 301 and the second signal power 302 coincide.

According to some aspects, the determining S4 at which angle 307 a local maximum value 304 for both the first signal power 301 and the second signal power 302 coincide comprises:

normalizing S41 the first signal power 301 and the second signal power 302;

calculating S42 a difference signal 303 between the normalized first signal power 301 and the normalized second signal power 302; and determining S43 a local minima 305 for the difference signal 303.

According to some aspects, the first directive antenna 101 uses an array antenna 201 that in turn uses a first plurality of antenna elements 204 for the first effective antenna aperture 202, and a second plurality of antenna elements 205, comprised in the first plurality of antenna elements 204, for the second effective antenna aperture 203.

According to some aspects, the first directive antenna 101 is an array antenna 201 that uses a first plurality of antenna elements 204 for the first effective antenna aperture 202, where a second plurality of antenna elements 205 comprised in the first plurality of antenna elements 204 are phase shifted for the second effective antenna aperture.

According to some aspects, the first directive antenna 101 is a reflector antenna 401 that has a first antenna feeder 402 used for the first effective antenna aperture and a second antenna feeder 403 used for the second effective antenna aperture, where one antenna feeder is in focus and the other antenna feeder is out of focus. This results in a wider main beam versus azimuth angle, and is used for the second effective antenna aperture.

According to some aspects, the first directive antenna 101 is a reflector antenna 501 where a refracting element 502 is used for the second effective antenna aperture.

According to some aspects, the method comprises toggling the first directive antenna 101 between the first effective antenna aperture 202 and the second effective antenna aperture 203 while moving the first directive antenna 101 past the desired alignment angle 307.

According to some aspects, the method comprises moving the first directive antenna 101 past the desired alignment angle 307 at a first time while using the first effective antenna aperture 202, and moving the first directive antenna 101 past the desired alignment angle 307 at a second time while using the second effective antenna aperture 203.

According to some aspects, each signal power 301, 302 corresponds to a received signal strength indication, RSSI, value.

Generally, the present disclosure also relates to a device 140 adapted for aligning a first directive antenna 101 in an alignment direction D1 towards a second antenna 102, where the device is adapted to acquire measurement data regarding:
 a first signal power 301 received from the second antenna 102 using a first effective antenna aperture 202 when the first directive antenna 101 is moved along an angular span 306 passing a desired alignment angle 307 along a certain direction 111, 112; and
 a second signal power 302 received from the second antenna 102 using a second effective antenna aperture 203 when the first directive antenna 101 is moved along an angular span 306 passing a desired alignment angle 307 along a certain direction, the second effective antenna aperture 203 being smaller than the first effective antenna aperture 202;
where the device 140 furthermore is adapted to determine the alignment direction D1 as an angle 307 in the angular span 306, at which angle 307 a local maximum value 304 for both the first signal power 301 and the second signal power 302 coincide.

According to some aspects, the first directive antenna 101 comprises an array antenna 201 that in turn comprises a first plurality of antenna elements 204 that is engaged for the first effective antenna aperture 202, and a second plurality of antenna elements 205, comprised in the first plurality of antenna elements 204, that is engaged for the second effective antenna aperture 203.

According to some aspects, the first directive antenna 101 comprises an array antenna 201 that in turn comprises a first plurality of antenna elements 204 that is engaged for the first effective antenna aperture 202, where a second plurality of antenna elements 205 comprised in the first plurality of antenna elements 204 are phase shifted for the second effective antenna aperture.

According to some aspects, the first directive antenna 101 is a reflector antenna 401 that comprises a first antenna feeder 402 that is engaged for the first effective antenna aperture and a second antenna feeder 403 that is engaged for the second effective antenna aperture, where one antenna feeder is in focus and the other antenna feeder is out of focus.

According to some aspects, the first directive antenna 101 is a reflector antenna 501, where the reflector antenna 501 comprises a refracting element 502 for the second effective antenna aperture.

According to some aspects, the device 140 is adapted to toggle the first directive antenna 101 between the first effective antenna aperture 202 and the second effective antenna aperture 203 while the first directive antenna 101 is moved past the desired alignment angle 307.

According to some aspects, the device is adapted to normalize the first signal power 301 and the second signal power 302, to calculate a difference signal 303 between the normalized first signal power 301 and the normalized second signal power 302, and to determine a local minima 305 for the difference signal 303.

According to some aspects, each signal power 301, 302 corresponds to a received signal strength indication, RSSI, value.

The invention claimed is:

1. A method, at a first directive antenna, for determining an alignment direction towards a second antenna, the method comprising:
 moving the first directive antenna along an angular span passing a desired alignment angle along a certain direction;
 measuring a first signal power received from the second antenna using a first effective antenna aperture when moving the first directive antenna; measuring a second signal power received from the second antenna using a second effective antenna aperture when moving the first directive antenna; wherein the second effective antenna aperture is different from the first effective antenna aperture; and
 determining the alignment direction as an angle in the angular span, at which angle a local maximum value for both the first signal power and the second signal power coincide: wherein determining the alignment direction comprises: normalizing the first signal power and the second signal power; calculating a difference signal between the normalized first signal power and the normalized second signal power; and determining a local minima for the difference signal.

2. The method of claim 1, wherein the first directive antenna uses an array antenna that in turn uses a first plurality of antenna elements for the first effective antenna aperture, and a second plurality of antenna elements, comprised in the first plurality of antenna elements, for the second effective antenna aperture.

3. The method of claim 1, wherein the first directive antenna uses an array antenna that in turn uses a first plurality of antenna elements for the first effective antenna aperture, where a second plurality of antenna elements comprised in the first plurality of antenna elements are phase shifted for the second effective antenna aperture.

4. The method of claim 1, wherein the first directive antenna is a reflector antenna that has a first antenna feeder used for the first effective antenna aperture and a second antenna feeder used for the second effective antenna aperture, where one antenna feeder is in focus and the other antenna feeder is out of focus.

5. The method of claim 1, wherein the first directive antenna is a reflector antenna; wherein a refracting element is used for the second effective antenna aperture.

6. The method of claim 1, wherein the method comprises:
moving the first directive antenna past the desired alignment angle at a first time while using the first effective antenna aperture; and
moving the first directive antenna past the desired alignment angle at a second time while using the second effective antenna aperture.

7. The method of claim 1, wherein each signal power corresponds to a received signal strength indication (RSSI) value.

8. A method, at a first directive antenna, for determining an alignment direction towards a second antenna, the method comprising:
moving the first directive antenna along an angular span passing a desired alignment angle along a certain direction;
measuring a first signal power received from the second antenna using a first effective antenna aperture when moving the first directive antenna;
measuring a second signal power received from the second antenna using a second effective antenna aperture when moving the first directive antenna; wherein the second effective antenna aperture is different from the first effective antenna aperture;
toggling the first directive antenna between the first effective antenna aperture and the second effective antenna aperture while moving the first directive antenna past the desired alignment angle; and
determining the alignment direction as an angle in the angular span, at which angle a local maximum value for both the first signal power and the second signal power coincide.

9. A device adapted for aligning a first directive antenna in an alignment direction towards a second antenna, the device comprising:
processing circuitry;
memory containing instructions executable by the processing circuitry whereby the device is operative to:
acquire measurement data regarding:
a first signal power received from the second antenna using a first effective antenna aperture when the first directive antenna is moved along an angular span passing a desired alignment angle along a certain direction; and
a second signal power received from the second antenna using a second effective antenna aperture when the first directive antenna is moved along an angular span passing a desired alignment angle along a certain direction; wherein the second effective antenna aperture is smaller than the first effective antenna aperture;
determine the alignment direction as an angle in the angular span, at which angle a local maximum value for both the first signal power and the second signal power coincide, wherein determining the alignment direction comprises:
normalizing the first signal power and the second signal power;
calculating a difference signal between the normalized first signal power and the normalized second signal power; and
determining a local minima for the difference signal.

10. The device of claim 9, wherein the first directive antenna comprises an array antenna that in turn comprises a first plurality of antenna elements that is engaged for the first effective antenna aperture, and a second plurality of antenna elements, comprised in the first plurality of antenna elements, that is engaged for the second effective antenna aperture.

11. The device of claim 9, wherein the first directive antenna comprises an array antenna that in turn comprises a first plurality of antenna elements that is engaged for the first effective antenna aperture; wherein a second plurality of antenna elements comprised in the first plurality of antenna elements are phase shifted for the second effective antenna aperture.

12. The device of claim 9:
wherein the first directive antenna is a reflector antenna that comprises:
a first antenna feeder that is engaged for the first effective antenna aperture; and
a second antenna feeder that is engaged for the second effective antenna aperture;
wherein one antenna feeder is in focus and the other antenna feeder is out of focus.

13. The device of claim 9, wherein the first directive antenna is a reflector antenna; wherein the reflector antenna comprises a refracting element for the second effective antenna aperture.

14. The device of claim 9, wherein each signal power corresponds to a received signal strength indication (RSSI) value.

15. A device adapted for aligning a first directive antenna in an alignment direction towards a second antenna, the device comprising:
processing circuitry;
memory containing instructions executable by the processing circuitry whereby the device is operative to:
acquire measurement data regarding:
a first signal power received from the second antenna using a first effective antenna aperture when the first directive antenna is moved along an angular span passing a desired alignment angle along a certain direction; and
a second signal power received from the second antenna using a second effective antenna aperture when the first directive antenna is moved along an angular span passing a desired alignment angle along a certain direction; wherein the second effective antenna aperture is smaller than the first effective antenna aperture;
toggle the first directive antenna between the first effective antenna aperture and the second effective antenna aperture while the first directive antenna is moved past the desired alignment angle; and
determine the alignment direction as an angle in the angular span, at which angle a local maximum value for both the first signal power and the second signal power coincide.

* * * * *